United States Patent
Bayya et al.

(10) Patent No.: US 7,670,685 B2
(45) Date of Patent: Mar. 2, 2010

(54) LOW LOSS VISIBLE-IR TRANSMITTING GLASS-CERAMIC SPINEL COMPOSITES AND PROCESS

(75) Inventors: Shyam S. Bayya, Ashburn, VA (US); Jasbinder S. Sanghera, Ashburn, VA (US); Guillermo Villalobos, Springfield, VA (US); Geoffrey Chin, Alexandria, VA (US); Ishwar D. Aggarwal, Fairfax, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 468 days.

(21) Appl. No.: 11/250,697

(22) Filed: Oct. 13, 2005

(65) Prior Publication Data

US 2007/0087204 A1     Apr. 19, 2007

(51) Int. Cl.
*B32B 15/04* (2006.01)
(52) U.S. Cl. ....................... 428/432; 428/701
(58) Field of Classification Search ............... 252/514; 428/44, 46, 68, 432, 688, 701; 501/10, 42; 437/3, 5, 181
See application file for complete search history.

(56) References Cited

U.S. PATENT DOCUMENTS

| | | | | |
|---|---|---|---|---|
| 3,607,789 A | * | 9/1971 | Murthy et al. | 252/514 |
| 4,983,555 A | * | 1/1991 | Roy et al. | 501/120 |
| 5,173,443 A | * | 12/1992 | Biricik et al. | 438/72 |
| 5,486,495 A | * | 1/1996 | Jewell et al. | 501/10 |
| 5,786,287 A | * | 7/1998 | Bayya et al. | 501/10 |
| 5,858,496 A | * | 1/1999 | Fisher et al. | 428/44 |
| 2006/0093738 A1 | * | 5/2006 | Lin et al. | 427/190 |

* cited by examiner

*Primary Examiner*—Timothy M Speer
*Assistant Examiner*—Lauren Robinson
(74) *Attorney, Agent, or Firm*—Stephen T. Hunnius; John J. Karasek

(57) ABSTRACT

This invention pertains to a composite of Spinel and BGG glass substrates and to process for bonding Spinel to BGG glass. The composite includes a Spinel and a BGG glass bonded together and having transmission in the visible and mid-infrared wavelength region. The process includes the step of heating them together above the softening temperature of the BGG glass, the composite having excellent, i.e., typically in excess of about 80%, transmission in the 0.5-5 wavelength region.

9 Claims, 3 Drawing Sheets

LOW LOSS VISIBLE-IR TRANSMITTING GLASS-CERAMIC SPINEL COMPOSITES AND PROCESS

BACKGROUND OF THE INVENTION

1. Field of the Invention

This invention pertains to composites of a suitable germanate glass, particularly barium gallogermanate (BGG) glass, and spinel, and to a process for forming composites of the glass and the spinel by bonding them together.

2. Description of Related Art

There are numerous sensor and laser systems operating in the visible-infrared (IR) wavelength band of 0.4-5 μm which require windows, domes and other structures for protection. The size, shape and desired properties of the windows/domes depend on the application. These applications can be very military specific, such as sensor windows and domes on an aircraft; reconnaissance windows on manned and unmanned aerial vehicles and missile domes. On the other hand, the applications can be commercial, such as small and inexpensive lenses for infrared optics and windows for all visible and mid-wave lasers. Materials choice for any application is strongly dependent on the required properties, desired sizes and shape and material availability. For example, a dome shaped in a hemispherical or hyperhemispherical window might be required for missiles or some sensor applications.

Magnesium aluminate spinel, from here on is referred as spinel, is a candidate material for many of the applications in the 0.4-5 μm wavelength region. Spinel has a cubic crystal structure and transmits in the visible-IR region. It is a very hard material and consequently, its grinding and polishing costs are high. Applying a glass coating on the spinel substrate can significantly reduce its grinding and polishing costs. The index of refraction of glass and spinel can be matched to minimize reflection losses. The glass can be readily polished using traditional glass polishing techniques and therefore, considerably reduce the polishing costs of Spinel.

A new product is disclosed herein based on a BGG glass-spinel composite substrate. The new germanate glass is designed so that it can be easily bonded to a spinel substrate. The process for bonding the new glass to a spinel substrate is also disclosed. The bonded composite is very strong and withstands chemical and environmental abuse. The glass acts as an excellent dielectric layer in missile domes and window designs for applications requiring transmission in the visible, IR and microwave frequencies. For example, the composite can contain an electromagnetic interference (EMI) grid.

Many of the barium gallogermanate glasses disclosed in the U.S. Pat. No. 5,305,414 cannot be used here because of the large coefficient of thermal expansion (CTE) mismatch with spinel. Due to this large CTE mismatch, the BGG glass from previous inventions delaminates from spinel substrates during thermal cycling. The BGG glass suitable herein bonds very well to spinel and does not delaminate.

OBJECTS AND SUMMARY OF THE INVENTION

An object of this invention is a composite or a laminate of a barium gallogermanate glass, or any other suitable germanate glass, properly bonded to spinel.

Another object of this invention is a composite of a BGG glass and spinel that has excellent transmission in the wavelength range of about 0.4-5 μm.

Another object of this invention is a composite of a BGG glass and spinel that has matched coefficient of thermal expansion and index of refraction of the glass and the spinel.

Another object of this invention is the procedure for bonding a softer BGG glass substrate and a harder spinel substrate to realize cost saving in polishing the composite.

These and other objects of this invention can be achieved by bonding a BGG glass and spinel to form a composite thereof that can be polished on the glass side and thus save the polishing cost since the BGG glass is softer than spinel.

DETAILED DESCRIPTION OF THE INVENTION

Figure 1:
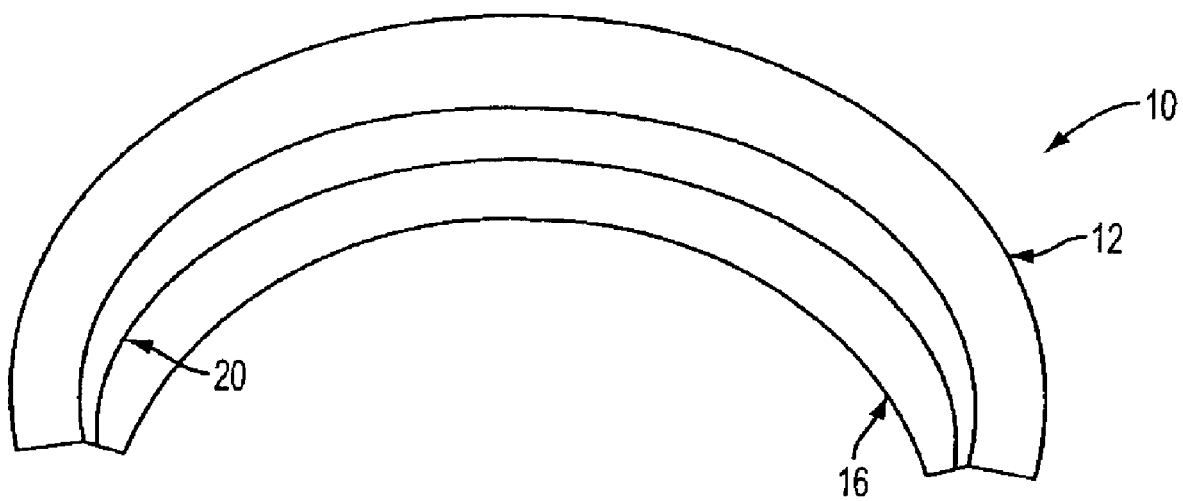
FIG. 1 is a schematic diagram of a composite of a spinel substrate and a BGG glass substrate in the shape of a dome, the BGG glass being 15 BaO/15 $Ga_2O_3$/70 $GeO_2$.
Figure 2:
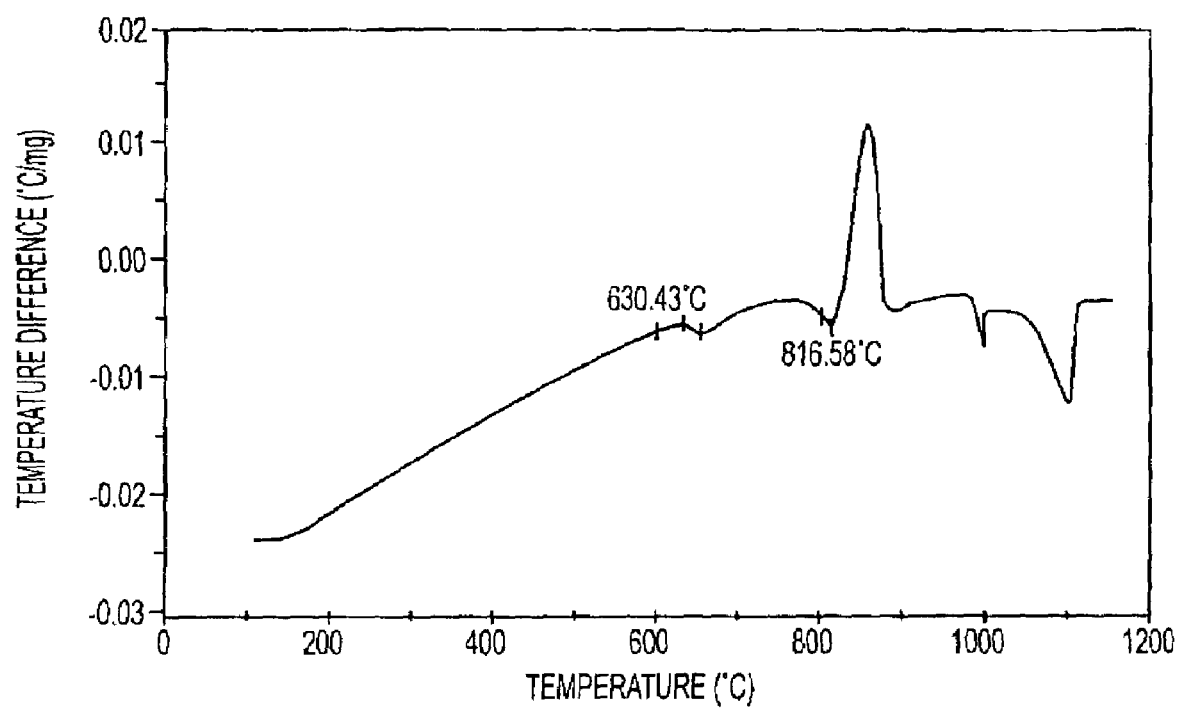
FIG. 2 is a differential thermal analysis trace of the BGG glass showing glass transmission temperature ($T_g$) of 630° C., crystallization temperature ($T_x$) of 816° C. and glass stability or glass working range temperature ($T_x$-$T_g$) of about 186° C.
Figure 3:
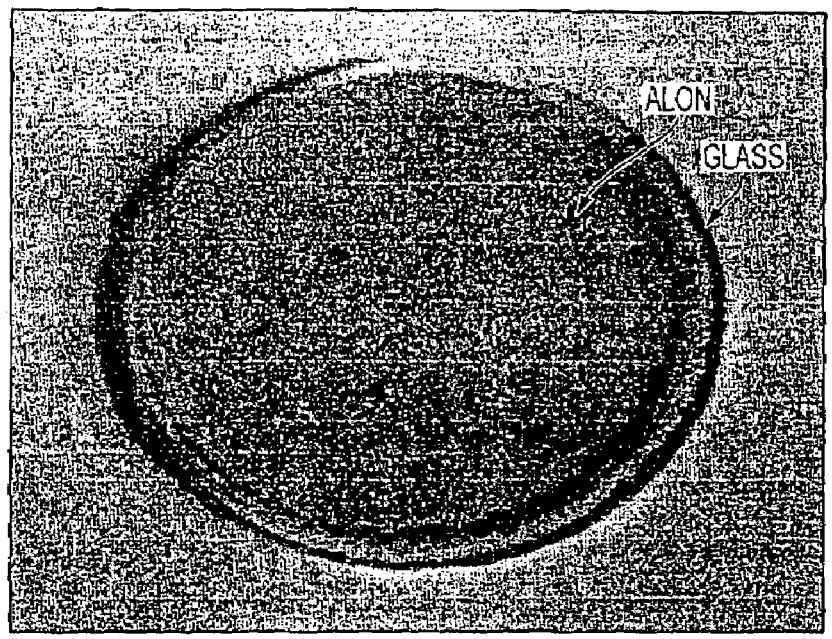
FIG. 3 is a picture showing excellent transmission of the BGG glass and the spinel composite window, as discussed in Example 3.

This invention, in a preferred embodiment, is directed to a new BGG glass-spinel composite and to a process for making it by bonding which requires matched coefficient of thermal expansion and matched refractive index of spinel and BGG glass, wetting and diffusion. The glass does not have to be limited to BGG glass and may include other germanate glasses. By the term "germanate glass" it is meant that $GeO_2$ is the major glass former. The composite has excellent transmission in the 0.4-5 μm wavelength region that is suitable for various military and commercial visible and mid IR applications in lenses, optical devices, windows, domes and other geometric structures such as IRCM jam heads, visible IR windows, and the like. The BGG glass is designed with a coefficient of thermal expansion within $1 \times 10^{-6}$/K, and typically within $0.1 \times 10-6$/K of the value for spinel and refractive index of the glass is within 0.1 of spinel, and typically within 0.05. Depending on application, thickness of spinel and the glass is typically up to several millimeters. The bond between the glass and the spinel is very stable and survives repeated thermal cycling without delaminating.

Spinel is a crystalline material of the type $AB_2O_4$ where A is a +2 cation occupying the tetrahedral lattice sites in an oxygen cubic close-packed structure and B is a +3 cation occupying the octahedral lattice sites. Spinel is characterized by great hardness. In a preferred embodiment, spinel is $MgAl_2O_4$ consisting of an oxide of magnesium and aluminum. Spinel powder can be prepared by many techniques, including wet chemistry, solid state diffusion of oxides or by calcination or by vapor phase. Of particular interest is the process disclosed in patent application Ser. No. 10/601,884 filed Jun. 24, 2003, and entitled "Spinel and Process for Making Same" which is hereby incorporated by reference as if fully set forth herein. Spinel powder particles consist of crystallites which are typically less than 500 nm in diameter that can be agglomerated into larger sizes, typically varying from 500 nm to 100 μm, more typically 1-50 μm.

Spinel ceramic is strong and transparent from visible to 5.5 μm wavelength. Its mechanical properties are greater than that of glass and make it a leading candidate for use as transparent armor and window material. Commercially, it can be used as a stronger and thinner window for many applications, including lap top computers, cell phones, automotive glassing and headlamps, aerospace windshields and industrial blast shields. Spinel is formed into sheets and domes pursuant to a well known prior art procedure.

Some of the physical parameters of spinel and a BGG glass are given in Table I, below:

TABLE I

| | Spinel | BGG Glass* |
|---|---|---|
| Density, g/cc | 3.57 | 4.5 |
| Vicker's Hardness, kg/mm$^2$ | 1200 | 450 |
| Flexure Strength, MPa | 190 | 100 |
| Fracture Toughness, MPa · m$^{1/2}$ | 1.9 | 0.7 |
| Refractive Index(RI) at 632 nm wavelength | 1.71 | 1.70 |
| Change in RI with Temperature, ×10$^{-6}$/K | 3 | 8 |
| Coefficient of Thermal Expansion, ×10$^{-6}$/K | 6.2 | 6.3 |
| Thermal Conductivity, W/mK | 14.6 | 1 |
| Transmission Window, μm | 0.3-5.5 | 0.4-5 |

*The glass was 15BaO—15Ga$_2$O$_3$—70GeO$_2$

Dense, transparent spinel ceramics are not currently available from a commercial source although there are companies currently trying to develop a viable manufacturing process. Since presently there is no viable manufacturing process, except the one disclosed in the above-noted application, the cost of spinel products is so high that even the military avoids its use.

In preparing difficult to sinter materials, such as spinel, the material is typically mixed with a sintering aid, such as lithium fluoride, or a secondary material that aids in densification. The sintering aids work in a variety of fashions. The sintering aids can liquefy at or somewhat below the primary material's densification temperature thereby promoting liquid phase sintering. Certain sintering aid materials exhibit higher solid state diffusion coefficients than the primary material's self-diffusion coefficient. The secondary material can conversely have a lower solid state diffusion coefficient that prevents exaggerated grain growth and promotes grain boundary refinement and pinning. The sintering aid can also simply clean or etch the primary material's surfaces thereby enhancing solid state diffusion. These are broad examples of the mechanisms by which sintering aids enhance densification. In actual practice, sintering aids may not fit into just one of the categories outlined above and the same sintering aid can have different function in different material systems or have no effect in other systems.

The BGG glass of this invention, which can transmit light over visible and infrared regions of the light spectra, is characterized by a composition that contains three principal components, although, it should be understood that the glass composition described herein can contain more components than specified herein. The glass composition described herein contains germanium oxide (GeO$_2$); barium oxide (BaO); and gallium oxide (Ga$_2$O$_3$), or more correctly, gallium sesquioxide. It should be understood that other components, such as lanthanum oxide (La$_2$O$_3$), aluminum oxide (Al$_2$O$_3$) indium oxide (In$_2$O$_3$), and other components such as ZnO, SrO, CaO, Zr$_2$O, Y$_2$O$_3$, Gd$_2$O$_3$, Na$_2$O, K$_2$O, Rb$_2$O, Cs$_2$O, and the like, can be included in the glass composition disclosed herein, up to about 10 mole %, as long as they do not change the character of the glass.

To avoid crystallization, the mole ratio of barium oxide to gallium oxide should be about 2:1 to 1:1, preferably 1.5:1 to 1:1, and amount of germanium oxide should be about 60 to 95 mole percent, preferably 65 to 90 mole percent, based on the amount of germanium oxide, barium oxide and gallium oxide in the glass composition. If the glass composition is melted with no intention of processing into a fiber application, amount of germanium oxide in the glass composition can be as low as about 40 mole percent and the ratio of barium oxide to gallium oxide can be as high as about 4:1 and as low as about 1:1, on molar basis, in order to avoid crystallization in the glass, where crystallization is undesirable. About 0.1 to about 5 molar percent, preferable 0.5 to 4, gallium oxide in the glass composition can be replaced with a modifying agent selected from lanthanum oxide or indium oxide. This means that if there is 15 mole percent of gallium oxide in a glass composition, up to about 5 mole percent of it can be replaced with a modifying agent. Preferred modifying agent is lanthanum oxide.

The preferred BGG glass composition is within the glass forming portion of the phase diagram and has the composition of, based on mole percent, 10-20 BaO/10-20 Ga$_2$O$_3$/60-80 GeO$_2$, which is purified to contain less than 5 ppm OH— ions and more preferably, less than 1 ppm OH— ions.

Presence of the modifying agent in the glass composition, described herein, imparts the advantage of increasing crystallization temperature. For instance, without any modifying agent, crystallization temperature of a BGG glass composition was 850° C. In the same composition with 2 mole percent gallium oxide replaced with lanthanum oxide, i.e., the preferred modifying agent, crystallization temperature was 903° C.

Glass transition temperatures of the glass compositions described herein vary from about 600° C. to about 700° C. For instance, at the molar ratio of barium oxide to gallium oxide of 1, T$_g$ of the glass composition containing 40 mole percent germanium oxide is slightly below 700° C. Also, at the molar ratio of barium oxide to gallium oxide of 1, the glass composition containing 65 mole percent germanium oxide has T$_g$ of about 667° C. The two glass compositions consisted of only barium oxide, gallium oxide and germanium oxide.

The way the glass is formed is by mixing high purity (99.999% plus) barium carbonate, gallium oxide and germanium oxide in a suitable amount for 2-4 hours; melting the batch thoroughly; and quenching it into a glass cullet. The cullet is then placed in a large platinum crucible, heated to a melting temperature, as described in Example 1, herein. The glass is then formed into the desired shape. The shaped glass is then annealed to relieve any stresses.

Preparation of a spinel—BGG glass composite typically involves cutting the BGG glass to the desired spinel substrate size and shape. The glass to be bonded is then optionally polished, using, for example, 800 grit size abrasive paper and cleaned, typically using isopropyl alcohol. Formation of the composite is typically made in a vacuum or air atmosphere at a temperature above T$_g$ but below T$_x$. A load can be used on the samples during the bonding process.

The glass is bonded to spinel substrate by heating them together above the softening temperature of the glass. At this bonding temperature, the glass softens and makes a good pore-free bond with essentially no entrapped air. The bonding procedure also works for spinel with electromagnetic interference (EMI) grids. The EMI grids are typically applied to windows requiring transmission in the visible-IR region with selective transmission/reflection of certain microwave frequencies. A slight vacuum can be used at times to assist in making a pore/bubble free joint between the two substrates. Once the glass is joined to the spinel substrate above the softening temperature of the glass, the glass is slowly cooled to the annealing temperature to release any thermal stresses followed by slow cooling to room temperature. Alternatively, it could be cooled to room temperature after joining, and then heated slowly to the annealing temperature to release any thermal stresses followed by slow cooling to room temperature.

More specifically, depending on application, either the glass or the spinel substrates, or both, can be pre-treated before forming the composite. For instance, an electromagnetic interference grid can be applied to the spinel before forming the composite.

The resulting composite has an excellent joint that does not separate on repeated cycling and can easily be polished and handled without delamination. In preparing a particular type of preferred embodiment of the invention containing an EMI grid for a missile dome, for example, the following steps are employed:

1. polishing inside surface of a spinel dome to promote bonding of the EMI grid, unless the spinel dome already has the desired surface smoothness, which is believed to be on the order of 10 μm RMS or better, on the inner surface;
2. applying an EMI grid to inside surface of the spinel dome;
3. bonding a BGG glass dome to interior surface of the spinel dome having secured thereto the EMI grid;
4. polishing the interior surface of the BGG glass and the outer surface of the spinel dome to improve optical transmission; and
5. optionally applying anti-reflective coatings on the outer surface of spinel and/or the inner surface of the BGG glass in the composite dome.

The outer surface of the BGG glass dome heed not be polished before bonding to the spinel dome due to the fact that the glass will flow when heated above its softening temperature. However, to facilitate bonding, the outer surface of the BGG glass dome can be polished to the desired smoothness before bonding to the spinel dome. Thickness of the spinel dome is 1-5 mm and typically 2-3 mm whereas thickness of the germanate glass dome is 0.1-5 mm and typically 0.2-3 mm.

In another embodiment, a germanate glass can be used as a glue to facilitate bonding two spinel domes with or without an intermediate EMI grid. Thickness of the germanate glass glue is typically sufficient to effect bonding.

In yet another embodiment, a lower softening temperature glass can be used as a glue to bond spinel dome with germanate glass dome with or without an intermediate EMI grid.

FIG. 1 is a schematic diagram of a composite dome 10 composed of spinel substrate 12 on the outside of the composite dome bonded to the inner BGG glass 16 to the inner surface of the spinel substrate 12. Electromagnetic interference grid 20 is optionally disposed between spinel substrate 12 and BGG glass 16. The grid is typically made of gold intersecting wires of about 1.2 μm in diameter with spacings of about 0.1 mm. The precise position and thickness of the grid depends on the optical requirements. During fabrication of the composite, load and/or pressure can be optionally used.

Figure 4:
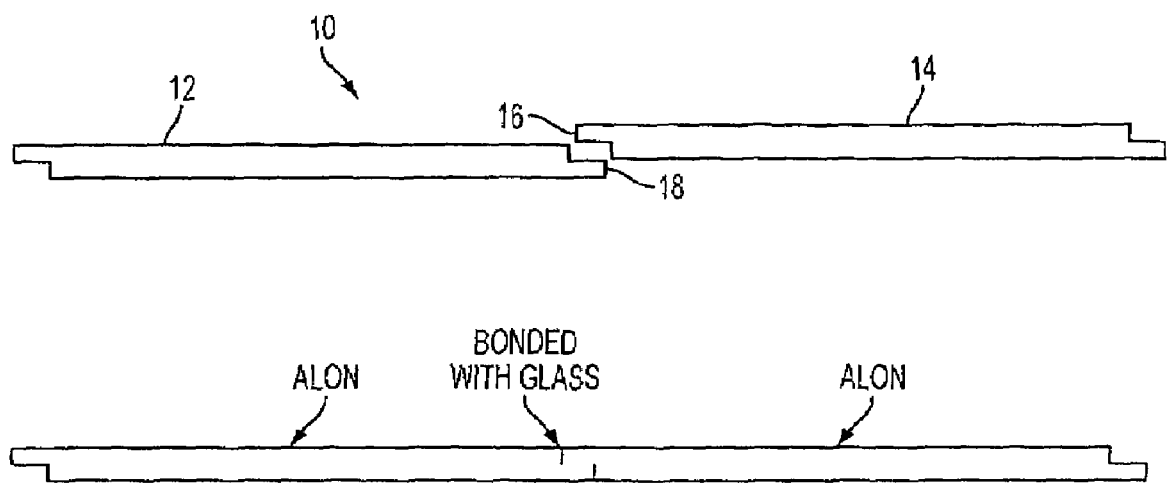
FIG. 4 shows a glass-spinel composite joined by the glass between the Spinel substrates.

Another embodiment of forming a spinel-BGG glass composite is shown in FIG. 4, where glass acts as a glue to bond panels together. Composites of windows can be made by way of a half-lap joint. As shown in FIG. 4, a pair of spinel substrates or panels 12 and 14 are joined at their edges 16 and 18 by notching the edges to form exposed surfaces. At least one, and typically all, exposed surfaces are coated with a thin layer of a suitable glass and the edges are joined and bonded by heating the glass and the spinel substrate edges to above the softening temperature of the glass. Following annealing and cooling to room temperature, a large composite is obtained by virtue of the strong bond between spinel substrates and the glass. Matching coefficient of thermal expansion and refractive indices of the glass and spinel substrates can make the joint nearly imperceptible.

The bond between the glass and spinel substrates was tested by thermal cycling between −50° C. and +150° C. The joint was found to be stable without any sign of failure or delamination. The glass/Spinel composite has the rain and sand erosion resistance to withstand harsh environmental conditions.

For certain applications, such as ceramic armor, where the Spinel composite has been developed as a strong candidate material in face shields, windshields, and the like, the glass coating/layer/substrate is utilized to keep polishing cost low. Glass possessing same or similar refractive index as spinel, will not introduce any noticeable reflection losses and at the same time, will significantly reduce the polishing costs of up to 50%. This is due to the principal fact that the glass can be polished using traditional glass polishing techniques.

The invention is further described by the following examples.

EXAMPLE 1

This example demonstrates preparation of BGG glass of this invention.

Pursuant to this example, a 200 gram-batch of the approximate composition of 15 BaO-15 $Ga_2O_3$-70 $GeO_2$ was prepared by mixing 45.22 grams of $BaCO_3$, 42.94 grams of $Ga_2O_3$ and 111.84 grams of $GeO_2$. The glass batch was mixed for 30 minutes and then transferred to a platinum crucible. The platinum crucible, containing the batch material, was placed in a pre-melting furnace preheated to 1350° C. The batch material was left in the furnace to melt for 10 minutes and then quenched in air to make a cullet. The cullet was then transferred to another crucible that was loaded into a sealed furnace with a controlled atmosphere. The furnace was heated to 1300° C. under $Ar/O_2$ atmosphere. The glass was bubbled with 80/20 mol ratio $Ar/O_2$ mixture for 9 hours to remove water. After 9 hours of bubbling, the bubbling tube was pulled out of the melt, with the $Ar/O_2$ gasses still flowing over the melt. The melt was left at 1300° C. for about another 3 hours to fine and was then quenched in the sealed furnace and allowed to cool to below the glass transition temperature of 637° C. The cooled glass was then taken out of the crucible and annealed. Annealing was performed by placing the sample in an annealing oven at 660° C. for 2 hours and then was slowly cooled to room temperature at 1° C. Barium chloride, in amount of about 5% in the batch, can also be used to remove OH— ions to less than 1 ppm.

EXAMPLE 2

This example demonstrates joining a BGG glass substrate to a spinel substrate.

Glass of 10 BaO-5 $BaCl_2$-15 $Ga_2O_3$-70 $GeO_2$ composition, obtained by the procedure described in Example 1, was cut into a 1"-diameter disc of 1.5 mm thickness. The glass was polished on the inner surface, using a final 800 grit paper. The glass and the spinel substrates were cleaned using isopropyl alcohol and then placed in contact to eventually form a composite under a mild vacuum of less than 1 Torr and under a load to obtain a pressure of about 100 psi during the bonding, i.e., heat-treatment process. The glass and spinel were heated together to the bonding temperature of 760° C. at a heating rate of 5° C./minute. The samples were held in contact at 760° C. for 1 hour for bonding and then cooled to 650° C. at a cooling rate of 5° C./minute. The bonded samples were held at 650° C. for 3 hours to release any stresses followed by a slow cool at 0.1° C./minute to room temperature. The product was a composite of the BGG and the spinel.

EXAMPLE 3

A polished spinel dome of dimensions 1.69 inches outside radius, 1.56 inches inner radius with a dome thickness of 0.13 inches and dome height of 1.54 inches was obtained. BGG glass dome was made by using a glass melting process described in Example 1, above, and cast into dome shape and annealed at 650° C. The glass dome was ground and polished to the dimensions of 1.56 inches outer diameter, 1.52 inches inner diameter with a thickness of 0.04 inches and dome height of 1.41 inches. The outer surface of the glass dome and inner surface of the spinel dome were cleaned in isopropyl alcohol. The BGG glass dome was fully placed inside the spinel dome to make full contact between outer surface of the BGG dome and the inner surface of the spinel dome. The domes were heated together using heating cycle described in Example 2, above, to bond and anneal the BGG and the spinel domes. A BGG-spinel composite dome was obtained with a very strong bond in between. The bonded dome was repeatedly cycled between −50° C. and +150° C. and after the test, the bonded composite dome indicated no sign of fracture or stresses or entrapped air.

EXAMPLE 4

This example is similar to Example 3, above, with the exception that an EMI grid was applied on the inside surface of the polished spinel dome before bonding it with the BGG glass dome.

EXAMPLE 5

This example is similar to the one described in Example 3, above, with the exception that during the entire bonding process, a vacuum of 1 Torr was used.

EXAMPLE 6

This example is similar to Example 5. The bonded composite dome from Example 5, above, was placed in a hot isostatic press (HIP) and heated to 750° C. at 5° C./min. At 750° C., an isostatic pressure of 5,000 psi was applied for 15 minutes while the sample was maintained at 750° C. After 15 minutes at 750° C., the isostatic pressure was released. The sample was cooled at 5° C./minute to 650° C. and held for 3 hours for annealing. The sample was then cooled to room temperature at 0.1° C./minute. The bonded composite dome had no entrapped air pockets.

EXAMPLE 7

This example is similar to Example 6, above, with the exception that an EMI grid was on the inside surface of spinel dome before it was bonded to the BGG glass dome, as used in Example 6.

While presently preferred embodiments have been shown of the novel composite and process for making it, and of the several modifications discussed, persons skilled in this art will readily appreciate the various additional changes and modifications can be made without departing from the spirit of the invention as defined and differentiated by the following claims.

What is claimed is:

1. A composite consisting essentially of a magnesium aluminate spinel and a non-electrically conducting germanate glass bonded together having transmission in the mid-infrared wavelength region,
   wherein said composite has transmission in excess of 50% in the 0.4-5 μm wavelength region,
   wherein the coefficient of thermal expansion of said spinel and said glass are within $1 \times 10^{-6}$/K; and
   wherein said glass is a BGG glass that contains one selected from the group consisting of $Al_2O_3$, $La_2O_3$, $ZnO$, $CaO$, $ZrO_2$, $In_2O_3$, $Y_2O_3$, $Gd_2O_3$, $Na_2O$, $K_2O$, $Cs_2O$, $Rb_2O$, $SrO$ and mixtures thereof in the amount up to 10%.

2. The composite of claim 1 wherein the composition of said glass, in mole percent, is 10-20 $BaO$/10-20 $Ga_2O_3$/60-80 $GeO_2$.

3. The composite of claim 1 which contains an EMI grid.

4. The composite of claim 1 wherein refractive index of said spinel and said glass is within 0.1, wherein thickness of said spinel is in the range of 1-5 mm and thickness of said glass is in the range of 0.1-5 mm, wherein said composite includes anti-reflective coating on the outer of said spinel and another anti-reflective on the inner surface of said germanate glass, and wherein crystallization temperature of said glass is above its glass transition temperature and its glass stability is in excess of 100° C.

5. A composite comprising a magnesium aluminate spinel and another magnesium aluminate spinel bonded together with a germanate glass and having transmission in mid-infrared wavelength region wherein said germanate glass is non-crystalline and non-electrically conductive and wherein said bonding is achieved without the use of an adhesive.

6. The composite of claim 5 wherein said glass is a BGG glass that contains one selected from the group consisting of $Al_2O_3$, $La_2O_3$, $ZnO$, $CaO$, $ZrO_2$, $In_2O_3$, $Y_2O_3$, $Gd_2O_3$, $Na_2O$, $K_2O$, $CsO$, $Rb_2O$, $SrO$ and mixtures thereof in the amount up to 10%.

7. The composite of claim 5 wherein the composition of said glass, in mole percent, is 10-20 $BaO$/10-20 $Ga_2O_3$/60-80 $GeO_2$.

8. The composite of claim 5 which contains an EMI grid.

9. The composite of claim 5 wherein refractive index of said spinel and said glass is within 0.1, wherein thickness of said spinel is in the range of 1-5 mm and thickness of said glass is in the range of 0.1-5 mm, wherein said composite includes anti-reflective coating on the outer of said spinel and another anti-reflective on the inner surface of said germanate glass, and wherein crystallization temperature of said glass is above its glass transition temperature and its glass stability is in excess of 100° C.

* * * * *